United States Patent
Wan et al.

(10) Patent No.: US 10,904,863 B2
(45) Date of Patent: Jan. 26, 2021

(54) METHOD AND DEVICE FOR RESOURCE RECONFIGURATION

(71) Applicant: Alcatel Lucent, Nozay (FR)

(72) Inventors: Yan Wan, Shanghai (CN); Cheng Wang, Shanghai (CN)

(73) Assignee: Alcatel Lucent, Nozay (FR)

(*) Notice: Subject to any disclaimer, the term of this patent is extended or adjusted under 35 U.S.C. 154(b) by 0 days.

(21) Appl. No.: 16/327,231

(22) PCT Filed: Aug. 22, 2017

(86) PCT No.: PCT/IB2017/001408
§ 371 (c)(1),
(2) Date: Feb. 21, 2019

(87) PCT Pub. No.: WO2018/037286
PCT Pub. Date: Mar. 1, 2018

(65) Prior Publication Data
US 2019/0215804 A1    Jul. 11, 2019

(30) Foreign Application Priority Data

Aug. 23, 2016    (CN) .......................... 2016 1 0711779

(51) Int. Cl.
*H04W 72/04*    (2009.01)
*H04W 24/02*    (2009.01)
(Continued)

(52) U.S. Cl.
CPC ........ *H04W 72/04* (2013.01); *G06F 9/45558* (2013.01); *H04W 24/02* (2013.01);
(Continued)

(58) Field of Classification Search
CPC ... H04W 72/04; H04W 24/02; H04W 88/085; G06F 9/45558; G06F 2009/4557;
(Continued)

(56) References Cited

U.S. PATENT DOCUMENTS

2014/0321413 A1* 10/2014 Luan ................... H04W 24/02
370/329
2014/0328178 A1   11/2014 Haberland et al.
(Continued)

FOREIGN PATENT DOCUMENTS

CN        101772177 A    7/2010
CN        103338241 A    10/2013
(Continued)

OTHER PUBLICATIONS

Bernd Haberland et al., "Radio Base Stations in the Cloud," Bell Labs Technical Journal, vol. 18, No. 1, pp. 129-152, XP055098994, 2013.

(Continued)

*Primary Examiner* — Jaime M Holliday
(74) *Attorney, Agent, or Firm* — Fay Sharpe LLP

(57) ABSTRACT

The present disclosure provides a method for resource reconfiguration and the corresponding device. A method provided in a first aspect of the present disclosure comprises: at a controller for managing a baseband unit (BU) pool, determining system status and resource usage conditions of the BU pool; based on the system status and the resource usage conditions, identifying a resource that needs to be reconfigured, the resource being selected from a virtual machine running on a server in the BU pool or from a processing module in an accelerator in the BU pool; determining an address of a target device using the resource, wherein the target device is selected from servers or accelerators in the BU pool; and instructing the target device to reconfigure the resource. The solution of the present disclosure effects reconfiguration of all resources in cloud RAN.

7 Claims, 3 Drawing Sheets

(51) Int. Cl.
*G06F 9/455* (2018.01)
*H04W 88/08* (2009.01)
*H04L 12/801* (2013.01)
*H04W 24/10* (2009.01)
*H04L 12/24* (2006.01)
*H04W 28/16* (2009.01)
*G06F 9/50* (2006.01)
*H04W 28/02* (2009.01)

(52) U.S. Cl.
CPC .... *G06F 9/5027* (2013.01); *G06F 2009/4557* (2013.01); *G06F 2009/45575* (2013.01); *H04L 41/12* (2013.01); *H04L 47/11* (2013.01); *H04W 24/10* (2013.01); *H04W 28/0289* (2013.01); *H04W 28/16* (2013.01); *H04W 88/085* (2013.01)

(58) Field of Classification Search
CPC ......... G06F 2009/45575; G06F 9/5027; G06F 2209/5011
See application file for complete search history.

(56) References Cited

U.S. PATENT DOCUMENTS

| | | | |
|---|---|---|---|
| 2015/0244430 A1 | 8/2015 | Shattil | |
| 2016/0119932 A1 | 4/2016 | Cui et al. | |
| 2016/0295572 A1* | 10/2016 | Hahn | H04W 76/10 |
| 2017/0310437 A1* | 10/2017 | Bottari | H04W 28/0252 |
| 2017/0311183 A1* | 10/2017 | Cotanis | H04W 28/16 |

FOREIGN PATENT DOCUMENTS

| | | |
|---|---|---|
| CN | 103559093 A | 2/2014 |
| CN | 103647854 A | 3/2014 |
| CN | 104657216 A | 5/2015 |
| JP | 2015-504270 A | 2/2015 |
| WO | WO 2015/166336 A2 | 11/2015 |

OTHER PUBLICATIONS

Bernd D. Haberland, "Smart Mobile Cloud," Alcatel-Lucent Bell Labs, pp. 1-28, XP055438616, 2014.

Tarik Taleb et al., "MobileCloud Networking—D3.1 Infrastructure Management Foundations—Specifications & Design for Mobile Cloud framework," Deliverables of MobileCloud Networking—FP7-ICT-2011-08 European project, pp. 1-255, XP055298623. 2012-2015.

Cheng Wang et al., "A Study on Virtual BS Live Migration—A seamless and Lossless Mechanism for Virtual BS Migration," IEEE 24th Annual International Symposium on Personal, Indoor, and Mobile Radio Communications (PIMRC), pp. 2803-2807, XP055225133, 2013.

Miljan Vuletic et al., "Programming Transparency and Portable Hardware Interfacing: Towards General-Purpose Reconfigurable Computing," 15th IEEE International Conference on Application-Specific Systems, Architectures and Processors, 13 pages, XP010730191, 2004.

Ngmn Alliance, "Further Study on Critical C-Ran Technologies," 93 pages, XP055376479, 2015.

International Search Report for PCT/IB2017/001408 dated Feb. 1, 2018.

* cited by examiner

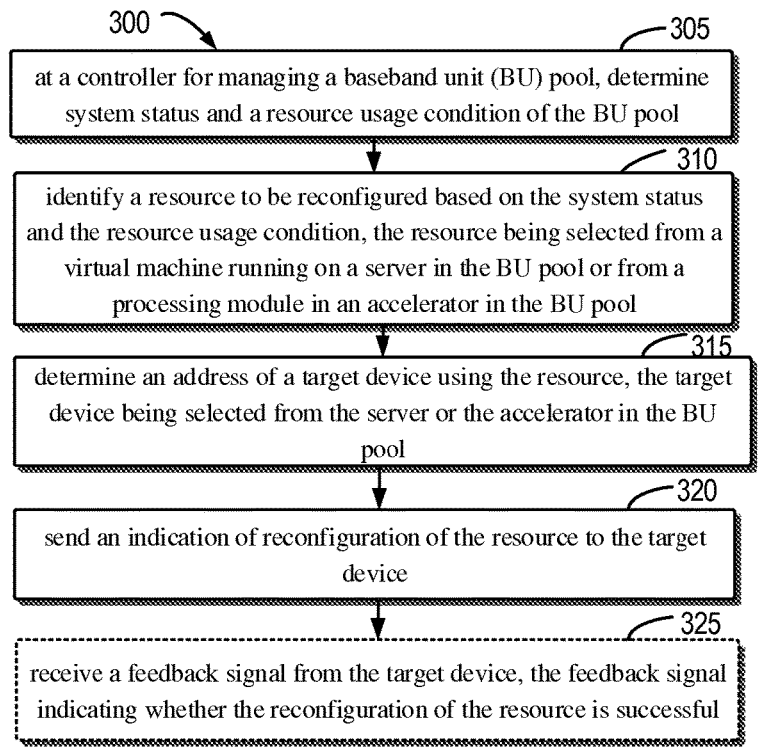
FIG. 3
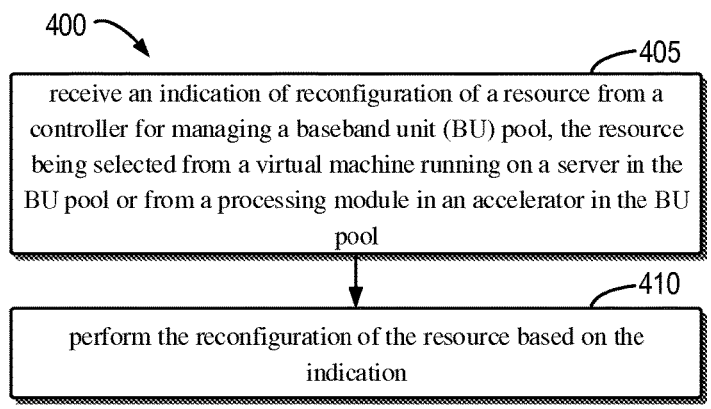
FIG. 4
| Flag bit 502 | Target device type 504 | Target device ID 506 | electronic device ID 508 | virtual machine ID 510 | processing module ID 512 | Command 514 |
FIG. 5

| 600 | | | | | | |
|---|---|---|---|---|---|---|
| Flag bit 602 | target device type 604 | target device ID 606 | electronic device ID 608 | virtual machine ID 610 | processing module ID 612 | reason 614 |

METHOD AND DEVICE FOR RESOURCE RECONFIGURATION

FIELD

Embodiments of the present disclosure generally relate to the communication field, and more particularly, to a method for resource reconfiguration, and the corresponding device.

BACKGROUND

The cloud radio access network (RAN) shall be a solution for future wireless cellular communication systems. On the research of 5G RAN, cloud/virtual RAN becomes a main direction of future RAN evolution. The cloud RAN can be characterized as centralized processing, open platform and virtualization, dynamical computing resources management, multi-standard and multi-RAT (radio access technology) support.

The traditional RAN has high real time requirements. In cloud RAN, a pure general purpose processing (GPP) platform cannot meet real time performance requirements. At present, the GPP plus hardware accelerator array is a potential option for cloud RAN architecture. For example, the layer 2 and layer 3 of RAN can be implemented in GPP while layer 1 is implemented in the hardware accelerator array. However, existing solutions for resource reconfiguration are far from perfect in cloud RAN with the platform of GPP and accelerator array.

SUMMARY

Generally the embodiments of the present disclosure propose a method for resource reconfiguration, and the corresponding device.

In a first aspect of the present disclosure, there is provided a method for resource reconfiguration. The method comprises: at a controller for managing a baseband unit (BU) pool, determining system status and a resource usage condition of the BU pool; identifying a resource to be reconfigured based on the system status and the resource usage condition, the resource being selected from a virtual machine running on a server in the BU pool or from a processing module in an accelerator in the BU pool; determining an address of a target device using the resource, the target device being selected from the server or the accelerator in the BU pool; and sending an indication of reconfiguration of the resource to the target device.

In some embodiments, sending the indication of reconfiguration of the resource to the target device: sending, to the target device, a signal for triggering the reconfiguration of the resource; and sending a reconfiguration file to the target device, the reconfiguration file indicating a modification to be made to the resource.

In some embodiments, the method further comprises: receiving a feedback signal from the target device, the feedback signal indicating whether the reconfiguration of the resource is successful.

In some embodiments, the method further comprises: in response to the feedback signal indicating that the reconfiguration is unsuccessful, sending, to the target device, an indication of terminating the reconfiguration of the resource.

In a second aspect of the present disclosure, there is provided a method for resource reconfiguration. The method comprises: receiving an indication of reconfiguration of a resource from a controller for managing a baseband unit (BU) pool, the resource being selected from a virtual machine running on a server in the BU pool or from a processing module in an accelerator in the BU pool; and performing the reconfiguration of the resource based on the indication.

In some embodiments, the receiving the indication comprises: receiving a signal for triggering the reconfiguration of the resource; and receiving a reconfiguration file, the reconfiguration file indicating a modification to be made to the resource.

In some embodiments, performing the reconfiguration of the resource based on the indication comprises: parsing the signal and the reconfiguration file to determine whether there is an error in the signal or the reconfiguration file; in response to determining that there is an error in the signal or the reconfiguration file, sending to the controller a feedback signal indicating that the reconfiguration is unsuccessful; and in response to determining that the signal and the reconfiguration file are correct, applying the modification to the resource.

In some embodiments, the method further comprises: storing the reconfiguration file.

In a third aspect of the present disclosure, there is provided an electronic device. The electronic device comprises: a memory; and a processor, coupled to the memory and configured to cause the electronic device to perform actions comprising: determining system status and a resource usage condition of a baseband unit (BU) pool; identifying a resource to be reconfigured based on the system status and the resource usage condition, the resource being selected from a virtual machine running on a server in the BU pool or from a processing module in an accelerator in the BU pool; determining an address of a target device using the resource, the target device being selected from the server or the accelerator in the BU pool; and sending an indication of reconfiguration of the resource to the target device.

In some embodiments, the sending the indication of reconfiguration of the resource to the target device comprises: sending, to the target device, a signal for triggering the reconfiguration of the resource; and sending a reconfiguration file to the target device, the reconfiguration file indicating a modification to be made to the resource.

In some embodiments, the actions further comprises: receiving a feedback signal from the target device, the feedback signal indicating whether the reconfiguration of the resource is successful.

In some embodiments, the actions further comprise: in response to the feedback signal indicating that the reconfiguration is unsuccessful, sending, to the target device, an indication of terminating reconfiguration of the resource.

In a fourth aspect of the present disclosure, there is provided an electronic device. The electronic device comprises: at least one processing module; an interface module configured to receive an indication of reconfiguration of a resource from a controller for managing a baseband unit (BU) pool, the resource being at least a part of the at least one processing module, the resource being at least one part of the at least one processing module; and a reconfiguration module configured to perform the reconfiguration of the resource based on the indication.

In some embodiments, the receiving module is further configured to: receive a signal for triggering the reconfiguration of the resource; and receive a reconfiguration file indicating a modification to be made to the resource.

In some embodiments, the reconfiguration module is further configured to: parse the signal and the reconfiguration file to determine whether there is an error in the signal or the reconfiguration file; in response to determining that there is an error in the signal or the reconfiguration file, send to the controller a feedback signal indicating that the reconfiguration is unsuccessful; and in response to determining that the signal and the reconfiguration file are correct, apply the modification to the resource.

In some embodiments, the electronic device further comprises: a storage module configured to store the reconfiguration file; and an internal configuration interface module configured to apply the modification to the resource.

In some embodiments, the electronic device is a field programmable gate array.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where

FIG. 3 illustrates a flowchart of a method for resource reconfiguration implemented at a controller according to some embodiments of the present disclosure;

FIG. 4 illustrates a flowchart of a method for resource reconfiguration implemented at a target device according to some embodiments of the present disclosure;

FIG. 5 illustrates a format of a reconfiguration request signal according to some embodiments of the present disclosure;

DETAILED DESCRIPTION OF EMBODIMENTS

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

During the study of cloud RAN with the platform of GPP and accelerator array, conventional solutions fail to solve some key problems so far. First of all, in order to share the computing resources including GPP and hardware accelerator array, it is desired that the computing resources are reconfigurable and can be scheduled based on real-time resource requirements. At present, the cloud RAN architecture with GPP and hardware accelerator has been proposed. However, all the computing resources in cloud RAN are not reconfigurable, especially to hardware accelerators.

Considering the tidal effect in RAN systems, live migration of virtual machines should be supported in cloud RAN systems. Live migration of virtual machine implemented in GPP platform with virtualization platform such as vmWare, KVM and Linux Container has been done a lot of research. But there has been little research on the live migration with hardware accelerator up to now. Moreover, all the computing resources in cloud RAN shall be shared between multiple standards and multiple radio access technologies. So all the computing resources shall be reconfigurable which can be reconfigured based on the requirements.

In order to at least in part solve above and other potential problems, embodiments of the present disclosure provide a solution for resource reconfiguration implemented in cloud RAN. Now some example embodiments of the present disclosure will be described below with reference to the figures. However, those skilled in the art will readily appreciate that the detailed description given herein with respect to these figures is for explanatory purpose as the present disclosure extends beyond these limited embodiments.

Figure 1:
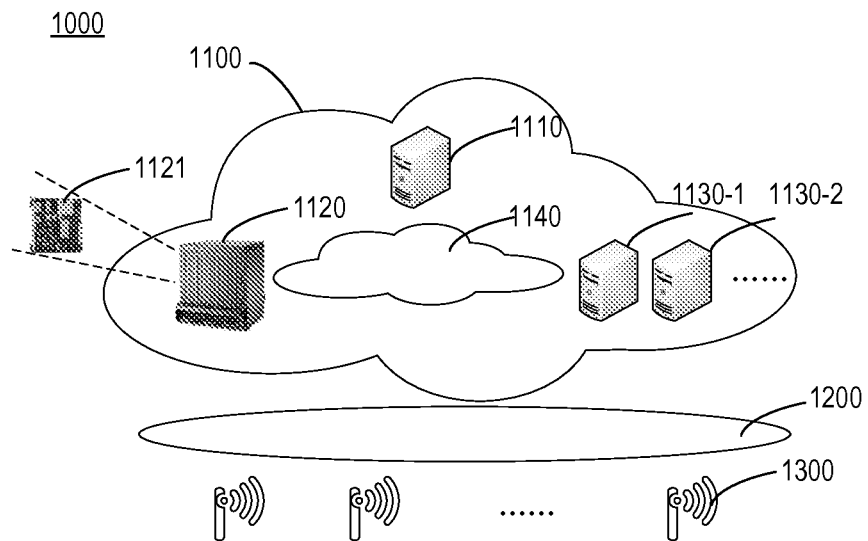
FIG. 1 illustrates an exemplary system 1000 in which some embodiments of the present disclosure may be implemented.

FIG. 1 shows a schematic view of an exemplary system 1000 in which the embodiments of the present disclosure may be implemented. The system 1000 comprises: a baseband unit (BU) pool 1100, a front backhaul network 1200 and multiple radio-frequency heads 1300. The radio-frequency heads 1300 distributed in different positions are connected to the BU pool 1100 via the front backhaul network 1200, so that centralized data processing is performed in the BU pool 1100.

The BU pool 1100 comprises: a controller 1110, a server cluster 1130 (e.g., GPP platform) and an internal switching network 1140. The controller 1110, an accelerator cluster 1120 and the server cluster 1130 implement data transmissions via the internal switching network 1140.

The controller 1110 is configured to control the reconfiguration of a resource (e.g., computing resources) in the BU pool 1100. In some embodiments, the resource are selected from a virtual machine running on a server in the server cluster 1130 or a processing module running on an accelerator in the accelerator cluster 1120.

The accelerator cluster 1120 may be implemented in the form of an accelerator array or multiple cards (e.g., PCIe cards) installed within a server. When the accelerator cluster 1120 is implemented as the multiple cards installed within a server, the port of an accelerator is a mode port (e.g., PCIe port); when the accelerator cluster 1120 is implemented in the form of an accelerator array, the port of an accelerator is a 10 GbE mode port.

Figure 2:
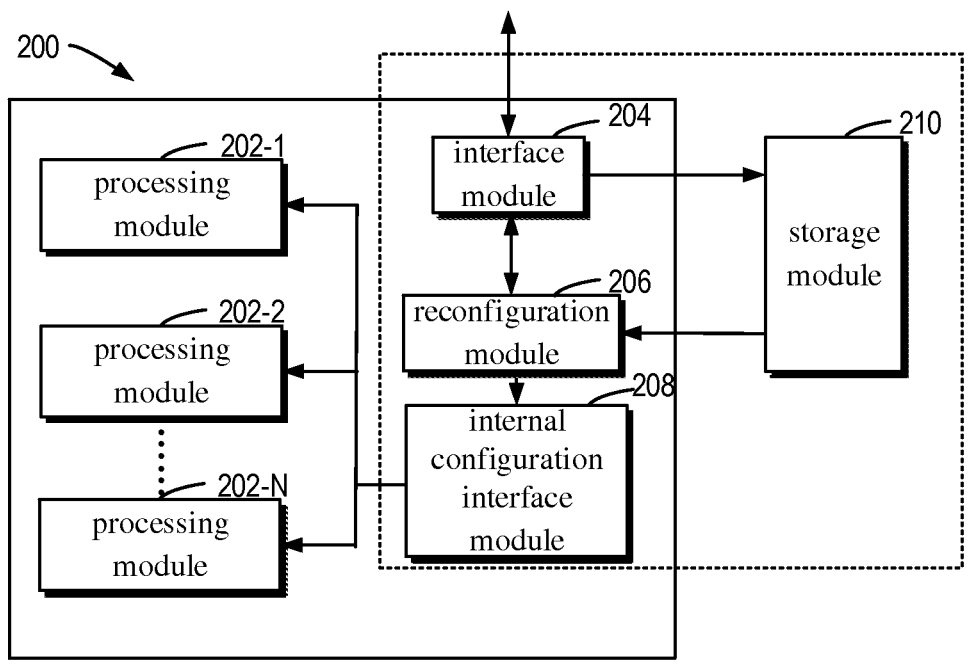
FIG. 2 illustrates a module diagram of a field programmable gate array for resource reconfiguration according to some embodiments of the present disclosure.

In some embodiments, each accelerator comprises at least one electronic device 1121, e.g., a field programmable gate array (FPGA) or any other hardware acceleration device. FIG. 2 shows a module diagram of a field programmable gate array 200 for resource reconfiguration according to some embodiments of the present disclosure. The FPGA 200 may act as the electronic device 1121 shown in FIG. 1. As shown in FIG. 2, the field programmable gate array 200 comprises: at least one reconfigurable processing module 202, an interface module 204, a reconfiguration module 206, an internal configuration interface module 208 and a storage module 210.

Each server (1130-1, 1130-2, etc.) in the server cluster 1130 comprises at least one electronic device, e.g., a CPU, which may be configured at least one virtual machine via a hypervisor.

With reference to FIG. 3 and FIG. 4, a method for resource reconfiguration implemented within the baseband unit pool 1100 is presented as below. First, referring to FIG. 3, which shows a flowchart of a method 300 for resource reconfiguration implemented at a controller according to some embodiments of the present disclosure.

As shown in FIG. 3, in block 305, the controller 1110 determines system status and resource usage condition of the baseband unit pool 1100. The system status and resource usage condition indicate the working condition of the accelerator and the server in the baseband unit pool 1100, as well as configuration and usage condition of the resource in the accelerator and the server. Resource are selected from a virtual machine running on a server in the baseband unit pool 1100 or a processing module in an accelerator in the baseband unit pool 1100.

In block 310, when the resources in the baseband unit pool 1100 need to be reconfigured for implementing a new application, the controller 1110 identifies a resource to be reconfigured based on the system status and the resource usage condition determined in block 305.

In block 315, the controller 1110 determines an address of a target device using a resource to be reconfigured, wherein the target device is selected from the server or the accelerator in the BU pool. In some embodiments, the addressing may be implemented by querying a prestored address mapping table which registers a mapping relationship among a target device, an electronic device (e.g., CPU in a server, FPGA in an accelerator), a resource (e.g., virtual machine in the CPU, processing module in the FPGA) and an address.

In block 320, the controller 1110 sends an indication of reconfiguration of the resource to the target device. In some embodiments, the controller 1110 sends a reconfiguration request signal and a reconfiguration file to a target device based on the determined address, so as to send the indication of reconfiguration of the resource to be configured, to the target device. The reconfiguration request signal is configured to trigger a reconfiguration of the resource, and the reconfiguration file indicates a configuration modification which is to be made to the resource or a new configuration file to which the resource is to be written.

In some embodiments, the reconfiguration request signal is configured in a format as shown in FIG. 5. In FIG. 5, a reconfiguration request signal 500 may comprise "a flag bit (Flag)" field 502 for indicating that whether the signal is a request signal or a feedback signal. In some embodiments, the flag occupies 1 bit, wherein "0" indicates the signal is a request signal, and "1" indicates the signal is a feedback signal.

In some embodiments, the reconfiguration request signal 500 may further comprise a "target device type (HW Type)" field 504 for indicating that whether the target device is a server or an accelerator. In some embodiments, the flag occupies 1 bit, wherein "0" indicates the target device is a server, and "1" indicates the target device is an accelerator.

Additionally or alternatively, in some embodiments, a "target device ID (HW ID)" field 506 may be configured to indicate the identity of a target device. An "electronic device ID (Chip ID)" field 508 may be configured to indicate the identity of an electronic device in a target device. A "virtual machine ID (VM ID)" field 510 may be configured to indicate the identity of a virtual machine. If the target device type indicates a server, then the field is used; if the target device type indicates an accelerator, then the field is blank.

In some embodiments, a "processing module ID (Module ID)" field 512 may be configured to indicate the identity of a processing module. If the target device type indicates a server, then the field is blank; if the target device type indicates an accelerator, then the field is used.

The reconfiguration request signal 500 may further comprise a "command (Command)" field 514 for indicating which command is to be performed. In some embodiments, the flag occupies 2 bits, wherein "00" represents "reserved", "01" represents "invoking an unoccupied resource", "10" represents "reconfiguring an occupied resource", and "11" represents "shutting down or erasing the configuration in the resource for power saving".

In some embodiments, at 325, optionally, the controller 1110 may receive a feedback signal from the target device, the feedback signal indicating whether the reconfiguration of the resource is successful. When the feedback signal indicates that the reconfiguration of a resource is unsuccessful, in response to the feedback signal, the controller 1110 sends, to the target device, an indication of terminating the reconfiguration of the resource. It is to be understood that the receipt of the feedback is not necessary and may be omitted in some embodiments.

Figures 6, 7:
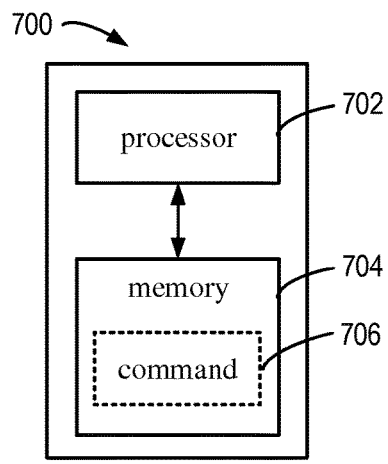
FIG. 6 illustrates a format of a feedback signal according to some embodiments of the present disclosure.
FIG. 7 illustrates a block diagram of an electronic device according to some embodiments of the present disclosure.

In some embodiments, the feedback signal is configured in a format as shown in FIG. 6. In FIG. 6, a feedback signal 600 may comprise "a flag bit (Flag)" field 602 for indicating whether the signal is a request signal or a feedback signal. In some embodiments, the flag occupies 1 bit, wherein "0" indicates the signal is a request signal, and "1" indicates the signal is a feedback signal.

In some embodiments, the feedback signal 600 may further comprise a "target device type (HW Type)" field 604 for indicating whether the target device is a server or an accelerator. In some embodiments, the flag occupies 1 bit, wherein "0" indicates the target device is a server, and "1" indicates the target device is an accelerator.

Additionally or alternatively, in some embodiments, a "target device ID (HW ID)" field 606 may be configured to indicate the identity of a target device. An "electronic device ID (Chip ID)" field 608 may be configured to indicate the identity of an electronic device in a target device. A "virtual machine ID (VM ID)" field 610 may be configured to indicate the identity of a virtual machine. If the target device type indicates a server, then the field is used; if the target device type indicates an accelerator, then the field is blank.

In some embodiments, a "processing module ID (Module ID)" field 612 may be configured to indicate the identity of a processing module. If the target device type indicates a server, then the field is blank; if the target device type indicates an accelerator, then the field is used.

The feedback signal 600 may further comprise a "reason (Reason)" field 614 for indicating whether the reconfiguration of a resource is successful, and if not, further indicating a reason for the failure. In some embodiments, the field occupies 3 bits, wherein "000" indicates reconfiguration success, "001" indicates a target device ID error leads to reconfiguration failure, "010" indicates an electronic device ID error leads to reconfiguration failure, "011" indicates a virtual machine ID error leads to reconfiguration failure, "100" indicates a processing module ID error leads to reconfiguration failure, "101" indicates a reconfiguration file error leads to reconfiguration failure, and "110" indicates an unknown reason leads to reconfiguration failure.

FIG. 4 shows a flowchart of a method for resource reconfiguration implemented at a target device according to some embodiments of the present disclosure. As shown in this figure, in block 405, the target device receives an indication of resource reconfiguration from a controller for managing a baseband unit (BU) pool.

Specifically, when the target device receives from the controller a reconfiguration request signal and a reconfiguration file of resource reconfiguration, the target device sends the reconfiguration request signal and reconfiguration file to a corresponding electronic device based on an electronic device ID field in the reconfiguration request signal, so that a resource in the electronic device is reconfigured accordingly.

In block 410, the resource is reconfigured according to the indication. To this end, the electronic device in the target device first parses the reconfiguration request signal and reconfiguration field to determine whether an error occurs in the signal and reconfiguration field or not. If yes, then a feedback signal indicating a reconfiguration error needs to be sent to the controller, wherein the feedback signal comprises a field indicating a reason for the error. If not, then the corresponding resource is reconfigured based on the reconfiguration request signal and reconfiguration field, and a feedback signal indicating reconfiguration success is sent to the controller after completion of the reconfiguration. In some embodiments, since the reconfiguration file might be used repetitively during various reconfiguration procedures, the reconfiguration file may be stored in a memory for use later.

In some embodiments, the controller 1110 may be implemented via an electronic device 700 shown in FIG. 7. As shown in this figure, the electronic device 700 comprises a processor 702 and a memory 704 in which instructions 706 executable by the processor 702 may be stored. The memory 704 may be of any appropriate type that is applicable to a local technical environment, and may be implemented using any appropriate data storage techniques, including without limitation to, semiconductor based memory devices, magnetic memory devices and systems, optical memory devices and systems. Though only one memory unit is shown in FIG. 7, there may be a plurality of physically different memory units in the electronic device 700.

The processor 702 may be of any appropriate type that is applicable to a local technical environment, and may include without limitation to, a general-purpose computer, a special-purpose computer, a microprocessor, a digital signal processor (DSP), as well as one or more processors in a processor based multi-core processor architecture. The electronic device 700 may also comprise multiple processors 702. Various steps, functions and features in the procedure described with reference to FIG. 3 may be executed and implemented by the processor 702, whose details are ignored here.

In addition, as described above, in some embodiments the at least one electronic device 1121 comprised in the accelerator may be implemented by the field programmable gate array 200 disclosed in FIG. 2. The interface module 204 is configured to receive an indication of resource reconfiguration from the controller 1110 for managing the baseband unit (BU) pool, wherein the resource is at least one part in the processing module 202. The indication comprises a reconfiguration request signal and a reconfiguration file. In some embodiments, the interface module 204 is a 10 GbE mode port.

The reconfiguration module 206 is configured to reconfigure the resource according to the indication. Specifically, the reconfiguration module 206 may be configured to parse a reconfiguration request signal and a reconfiguration file so as to determine whether an error occurs in the signal and the reconfiguration file or not. If so, a feedback signal indicating reconfiguration error needs to be sent to the controller, wherein the feedback signal comprises a field indicating a reason for the error. If not, the corresponding resource is reconfigured based on the reconfiguration request signal and the reconfiguration file, and a feedback signal indicating the successful reconfiguration is sent to the controller after the reconfiguration is completed.

The internal configuration interface module 208 is an interface module between the reconfiguration module 206 and the processing module 202. The reconfiguration module 206 may make modifications to the processing module 202 via the internal configuration interface module 208.

The storage module 210 is configured to store a reconfiguration file. In some embodiments, the storage module 210 may be one part of the field programmable gate array 200 or may be a module independent of the field programmable gate array 200.

The modules shown in FIGS. 2 and 7 may be implemented, partially or entirely, as hardware modules, firmware modules or any combination thereof. Generally, various exemplary embodiments of the present disclosure may be implemented in hardware or special purpose circuits, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

What is claimed is:

1. A method for resource reconfiguration, comprising:
at a controller for managing a baseband unit (BU) pool, determining system status and a resource usage condition of the BU pool;
identifying a resource to be reconfigured based on the system status and the resource usage condition, the resource being selected from a virtual machine running on a server in the BU pool or from a processing module in an accelerator in the BU pool;
determining an address of a target device using the resource, the target device being selected from the server or the accelerator in the BU pool;
sending an indication of reconfiguration of the resource to the target device, the indication including a signal for triggering the reconfiguration of the resource and a reconfiguration file or an identification of a reconfiguration file previously received by the target device indicating a modification to be made to the hardware of the resource; and
receiving a feedback signal from the target device, the feedback signal being based on a parsing of the signal for triggering the reconfiguration and the reconfiguration file or the identification of the reconfiguration file, to determine whether there is an error in the signal, the identification or the reconfiguration file, the feedback signal indicating whether there is successful reconfiguration or that there was an error in the signal, the identification or the reconfiguration file.

2. The method according to claim 1, further comprising:
in response to the feedback signal indicating that the reconfiguration is unsuccessful, sending, to the target device, an indication of terminating the reconfiguration of the resource.

3. A method for resource reconfiguration, comprising:
receiving an indication of reconfiguration of hardware of a resource from a controller for managing a baseband unit (BU) pool, the hardware of the resource being selected from virtual hardware of a virtual machine running on a server in the BU pool or from actual hardware of a processing module in an accelerator in the BU pool, the indication of reconfiguration include a signal for triggering the reconfiguration of the resource and a reconfiguration file or an identification of a previously received reconfiguration file indicating a modification to be made to the hardware of the resource; and
performing the reconfiguration of the resource based on the indication, wherein performing the reconfiguration includes parsing the signal and the reconfiguration file or the identification of the reconfiguration file to determine whether there is an error in the signal, the identification or the reconfiguration file;
in response to determining that there is an error in the signal, the identification or the reconfiguration file, sending to the controller a feedback signal indicating that the reconfiguration is unsuccessful; and
in response to determining that the signal and the reconfiguration file or the identification of the reconfiguration file are correct, applying the modification to the hardware of the resource.

4. The method according to claim 3, wherein the reconfiguration file is received, further comprising:
storing the reconfiguration file.

5. An electronic device, comprising:
at least one memory including computer program code; and
at least one processor, coupled to the memory, the memory and the computer program code configured to, with the at least one processor, cause the electronic device to at least perform actions comprising:
determining system status and a resource usage condition of a baseband unit (BU) pool;
identifying a resource to be reconfigured based on the system status and the resource usage condition, the resource being selected from a virtual machine running on a server in the BU pool or from a processing module in an accelerator in the BU pool;
determining an address of a target device using the resource, the target device being selected from the server or the accelerator in the BU pool;
sending an indication of reconfiguration of the resource to the target device, the indication including a signal for triggering the reconfiguration of the resource and a reconfiguration file or an identification of a reconfiguration file previously received by the target device indicating a modification to be made to the hardware of the resource; and
receiving a feedback signal from the target device, the feedback signal being based on a parsing of the signal for triggering the reconfiguration and the reconfiguration file or the identification of the reconfiguration file, to determine whether there is an error in the signal, the identification or the reconfiguration file, the feedback signal indicating whether there is successful reconfiguration or that there was an error in the signal, the identification or the reconfiguration file.

6. The electronic device according to claim 5, the actions further comprising:
in response to the feedback signal indicating that the reconfiguration is unsuccessful, sending, to the target device, an indication of terminating reconfiguration of the resource.

7. An electronic device, comprising:
at least one processor; and
at least one memory including computer program code, the at least one memory and the computer program code configured to, with the at least one processor, cause the electronic device to at least:
receive an indication of reconfiguration of a resource from a controller for managing a baseband unit (BU) pool, the resource being at least a part of the hardware of the at least electronic device, the indication of reconfiguration include a signal for triggering the reconfiguration of the resource and a reconfiguration file or an identification of a previously received reconfiguration file indicating a modification to be made to the hardware of the resource; and
perform the reconfiguration of the resource based on the indication, wherein performing the reconfiguration includes parsing the signal and the reconfiguration file or the identification of the reconfiguration file to determine whether there is an error in the signal, the identification or the reconfiguration file;

in response to determining that there is an error in the signal, the identification or the reconfiguration file, sending to the controller a feedback signal indicating that the reconfiguration is unsuccessful; and in response to determining that the signal and the reconfiguration file or the identification of the reconfiguration file are correct, applying the modification to the hardware of the resource.

* * * * *